US008373653B2

(12) United States Patent
Urbach

(10) Patent No.: US 8,373,653 B2
(45) Date of Patent: Feb. 12, 2013

(54) HAND INTEGRATED OPERATIONS PLATFORM

(75) Inventor: Walter Urbach, San Diego, CA (US)

(73) Assignees: Walter Urbach III Trust, La Jolla, CA (US), dated Aug. 5, 1992; Walter Urbach IV Trust, La Jolla, CA (US), dated Dec. 21, 2012; NorStar Asset Management, Inc., La Jolla, CA (US)

( * ) Notice: Subject to any disclaimer, the term of this patent is extended or adjusted under 35 U.S.C. 154(b) by 923 days.

(21) Appl. No.: 11/879,131

(22) Filed: Jul. 16, 2007

(65) Prior Publication Data
US 2009/0021481 A1 Jan. 22, 2009

(51) Int. Cl.
*G09G 5/00* (2006.01)

(52) U.S. Cl. ........ 345/156; 345/157; 345/158; 345/160; 345/161; 345/163; 345/167; 345/168; 345/173

(58) Field of Classification Search ........... 345/156–184
See application file for complete search history.

(56) References Cited

U.S. PATENT DOCUMENTS

| 4,954,817 | A | * | 9/1990 | Levine ........................ 345/179 |
| D391,250 | S | | 2/1998 | Swift et al. |
| 6,222,526 | B1 | | 4/2001 | Holmes |
| 6,380,923 | B1 | * | 4/2002 | Fukumoto et al. ............ 345/156 |
| 6,698,952 | B1 | * | 3/2004 | Goddard ........................ 400/88 |
| 6,870,526 | B2 | | 3/2005 | Zngf et al. |
| 7,057,604 | B2 | | 6/2006 | Bajramovic |
| 7,379,052 | B1 | | 5/2008 | Dellenger |
| 2001/0035856 | A1 | | 11/2001 | Myers |
| 2002/0118167 | A1 | | 8/2002 | Mei et al. |
| 2002/0175894 | A1 | * | 11/2002 | Grillo ........................ 345/156 |
| 2003/0076296 | A1 | | 4/2003 | Kolybaba |
| 2003/0090465 | A1 | * | 5/2003 | Dellinger ..................... 345/167 |
| 2004/0051694 | A1 | | 3/2004 | Backman et al. |
| 2005/0206619 | A1 | | 9/2005 | McLoone et al. |
| 2006/0129070 | A1 | | 6/2006 | Pearl et al. |
| 2006/0152484 | A1 | | 7/2006 | Rolus Borgward |
| 2006/0227101 | A1 | | 10/2006 | Kackman |
| 2007/0147025 | A1 | * | 6/2007 | Shirey ........................ 362/103 |

* cited by examiner

Primary Examiner — Kevin M Nguyen
Assistant Examiner — Cory Almeida
(74) Attorney, Agent, or Firm — Duane Morris LLP

(57) ABSTRACT

One embodiment of a hand integrated mouse platform remotely operates one or more computer applications while worn on the user's hand and the hand is also free to do other things such as keyboarding, driving, and flying.

21 Claims, 7 Drawing Sheets

FIG. 1
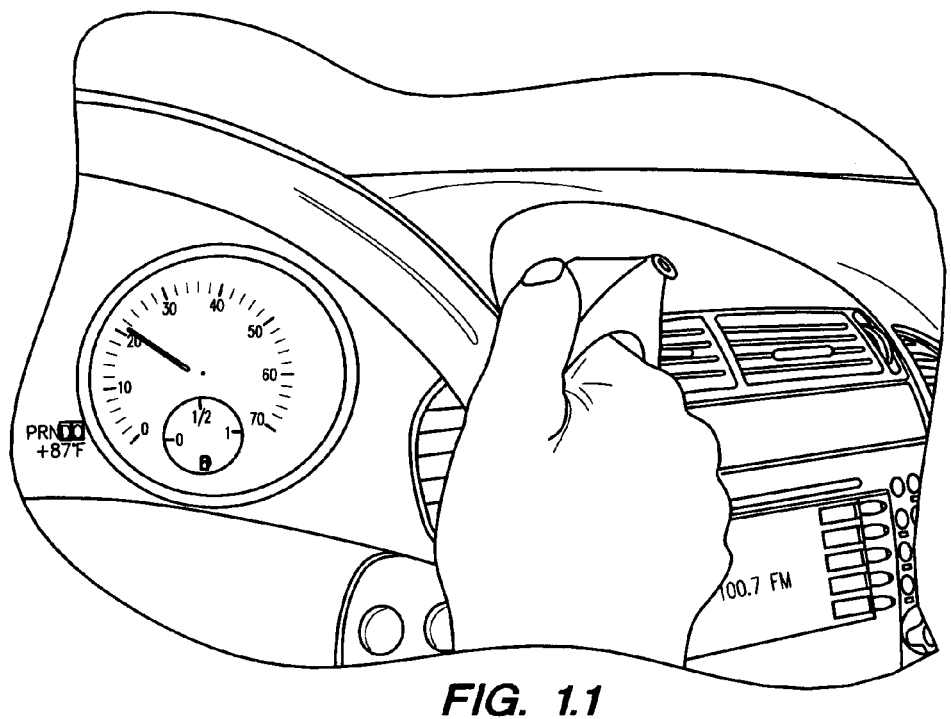
FIG. 1.1

FIG. 3.1

HAND INTEGRATED OPERATIONS PLATFORM

CROSS REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

1. Field of Invention

This invention relates to a controller platform similar in utility to a desktop computer mouse platform, but is unique in that it is configured to be operated while worn on the hand, configured to accommodate multiple controllers, and interfaces with one or more programs and its own power source.

2. Discussion of Prior Art

The most popular controller platform is the computer mouse, either wired or wireless. The mouse platform functions primarily as a pointing device. They are available in a large variety of sizes and colors and may be operated on a flat surface or hand-held. A large diversity in mouse platforms is available and may be equipped with an assortment of control buttons or wheels. They house at least one motion sensing mechanism. The purpose of the control buttons, joy sticks, wheels, and motion sensing mechanisms is to interface with the computer's software programs.

Currently, the most popular desktop computer mouse platforms are shaped like half an ostrich egg cut lengthwise, with the flat side facing down. The user usually rests their hand on or over the wider end of the top side area, with the smaller end facing away from the user. Two control buttons—a right and left are at the top of the small side with a scroll wheel between the right and left control buttons. The flat side bottom houses one of several types of motion sensing mechanisms.

Current computer mouse platform designs require the operator to reach out to and withdraw from the mouse platform between operations. A few designs provide that the mouse platform can be held in the operator's hand. However, they must also be picked up and put down in order to free the hand for some other task.

Operating a traditionally designed desktop computer mouse typically requires a dedicated flat surface area—limiting the use of desk space. For the operation of many programs, the use of both keyboard and mouse are essential.

None of the current designs allow the operator to use their hand and fingers for other functions while holding or operating the mouse. The constant reaching and withdrawing from the mouse to the keyboard and frequent necessity to pick it up and put it down is inefficient and can cause repetitive strain injury to the shoulder, elbow, and carpal tunnel.

SUMMARY

The Hand Integrated Mouse Platform will provide a new and distinctly different controller platform option for users and manufacturers. The Hand Integrated Mouse Platform provides a means for accommodating a multitude of controls such as: dials, wheels, joysticks, touch screen, camera, scanner, phone, speaker, microphone, switches, signal-strength bar, power bar, sensitivity control, security screener, and sensors that respond to motion and/or pressure; and that interface with one or multiple program applications and devices. The Hand Integrated Mouse Platform also contains its own power source. The primary difference between the Hand Integrated Mouse Platform and other platforms is that the operator may utilize the Hand Integrated Mouse Platform while doing other things that require the substantial use of their hands and fingers (such as keyboarding, driving, flying). This arrangement provides minimal interference while relieving users from the need to pick up, put down, or reach for the mouse or other platforms between operations. Although the Hand Integrated Mouse Platform can be either a wired or wireless (battery or rechargeable) platform it is much more functional in its wireless configuration. The finished embodiment will be determined by its specific proposed use and the space requirements of each individual controller. The benefits include: saving time, reducing operating space requirements, and reducing the likelihood of developing repetitive strain injury in the shoulder, elbow, and carpal tunnel; as well as allowing the user more flexibility in body positioning. This utility also lends itself to evolutionary changes as the electronics world becomes increasingly miniaturized and more functional.

DRAWINGS

In the drawings, closely related figures have the same number but different numeric or alphabetic suffixes.

FIG. 1 shows a perspective view of one embodiment integrated with the right hand as it could be used while keyboarding.

FIG. 1.1 shows a perspective view of FIG. 1 embodiment integrated with the right hand as it could be used while driving.

Figure 1A:
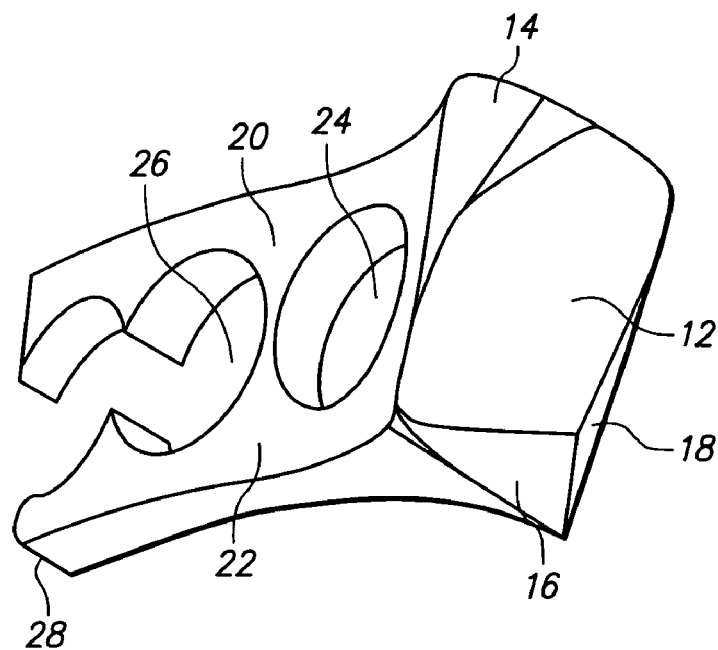
FIGS. 1A to 1C show various aspects of FIG. 1 embodiment.
Figure 1B:
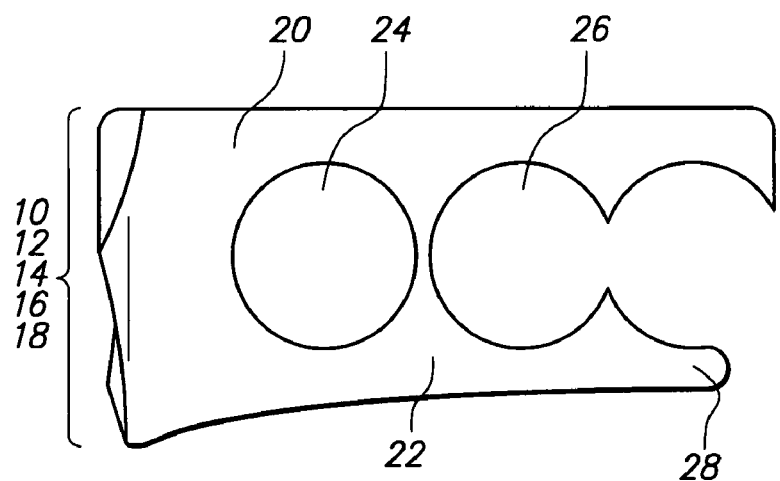
Figure 1C:
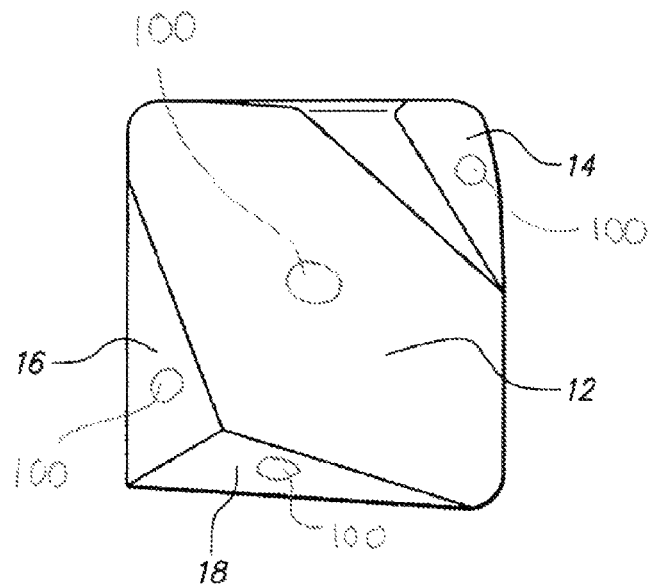
Figure 2:
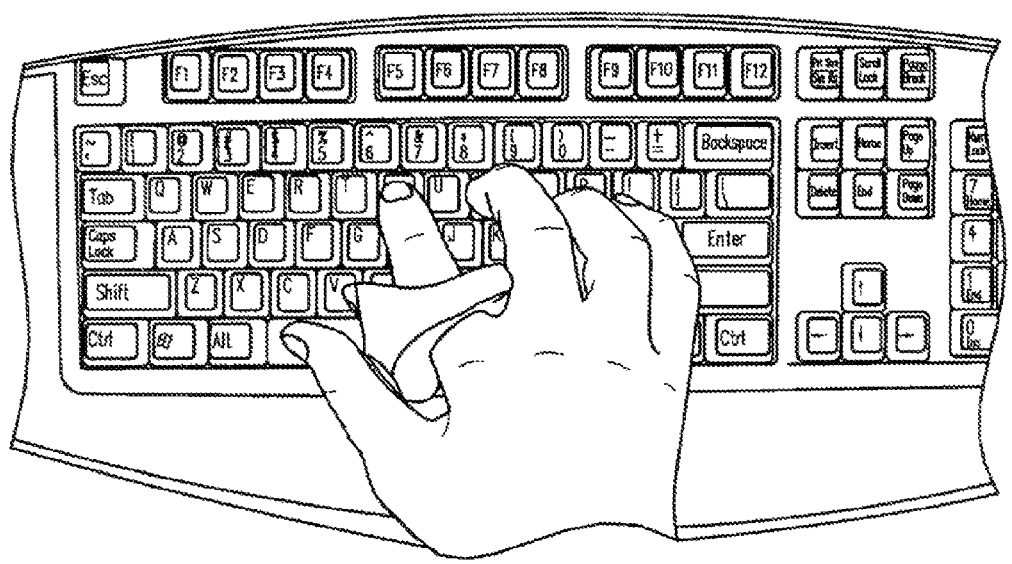
FIG. 2 shows a perspective view of the one embodiment, different from that in FIG. 1, integrated with the right hand as it could be used while keyboarding.
Figure 2A:
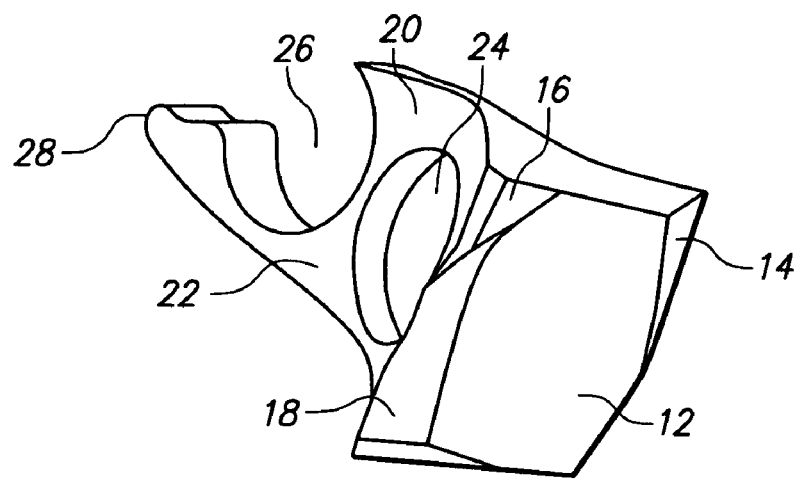
FIGS. 2A to 2C show various aspects of the FIG. 2 embodiment.
Figure 2B:
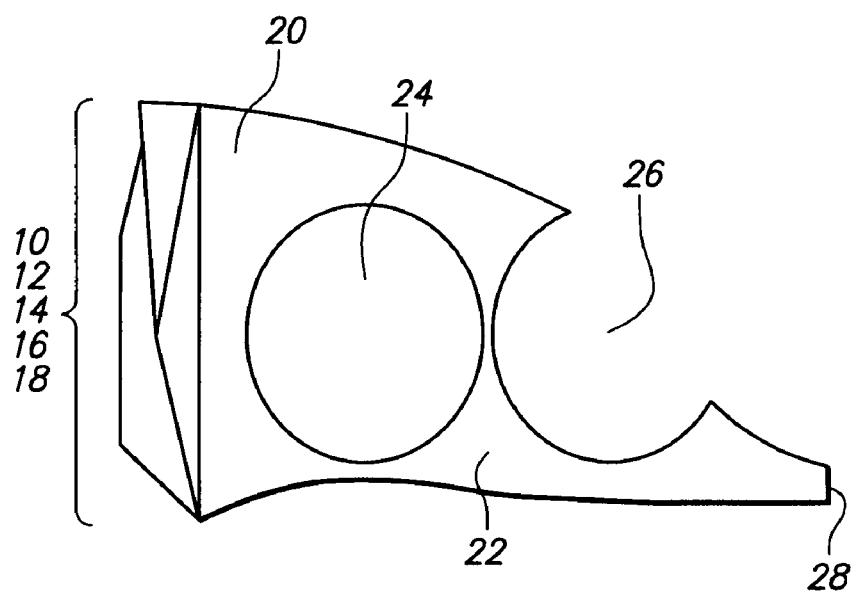
Figure 2C:
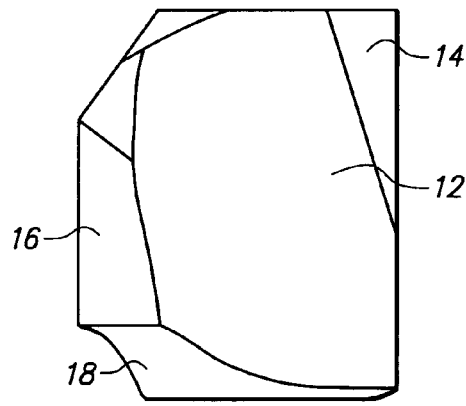
Figure 3:
FIG. 3 shows a perspective view of one embodiment, different from that in FIGS. 1 & 2, integrated with the right hand as it could be used while keyboarding.
Figure 3A:
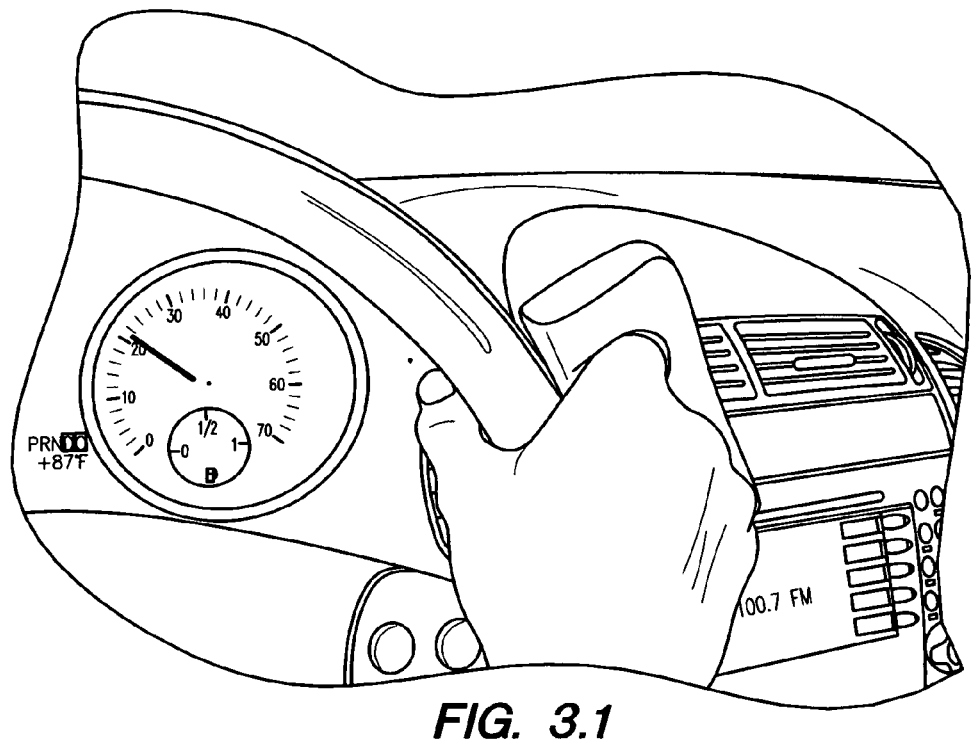
Figure 3A:
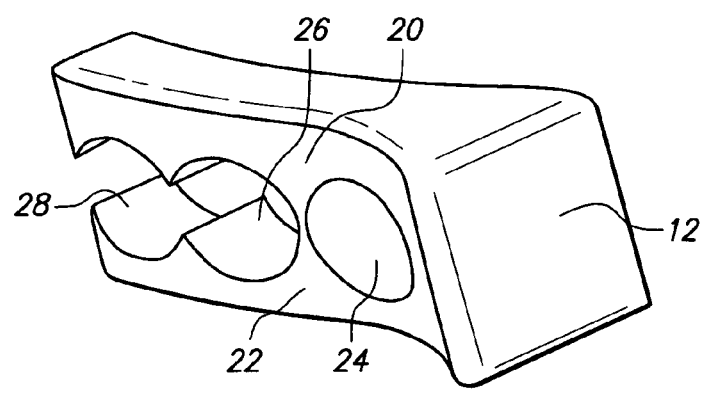
Figure 3B:
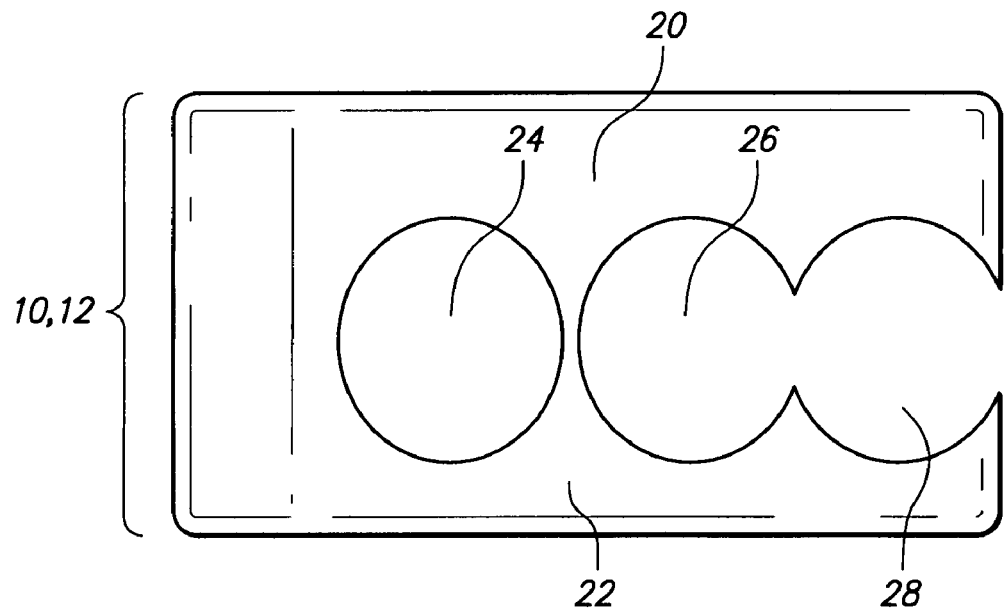
Figure 3C:
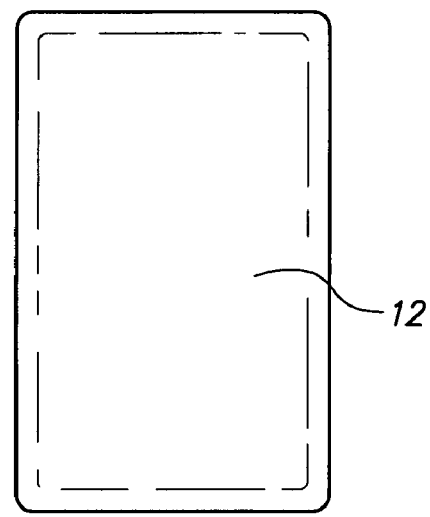

FIG. 3.1 shows a perspective view of the FIG. 3 embodiment integrated with the right hand as it could be used while driving FIGS. 3A to 3C show various aspects of an embodiment different from that in FIGS. 1 and 2.

REFERENCE NUMERALS

FIGS. 1, 2, and 3 show perspective views of different embodiments of the Hand Integrated Mouse Platform.
Note: Not all embodiments contain all the components cited below, but they all contain the essential platform (in various configurations) for incorporating a variety of interactive devices, power source, and the finger elements necessary to provide operating stability.

10. Face (may have one or multiple stages)
12. Main Stage (may be contoured to meet specific controller needs)
14. Second Stage (may be contoured to meet specific controller needs)
16. Third Stage (may be contoured to meet specific controller needs)

18. Fourth Stage (may be contoured to meet specific controller needs)
20. Knuckle Arm
22. Palm Arm
24. Index Finger Support Ring
26. Middle Finger Support Arm (finger be open)
28. Little Finger Support End (tapered)

DETAILED DESCRIPTION

The Face (10) is configured to accommodate one or more stages. It is most clearly illustrated in FIGS. 1A and 1B that Face 10 faces the user's thumb and not the user's fingers, when worn on the user's hand. FIGS. 1A and 1B also clearly illustrate that Face 10 is generally orthogonal to the longitudinal direction of the hand integrated mouse platform. The longitudinal direction is the left-to-right direction as shown in the configuration illustrated in FIG. 1 B, i.e. the direction along the knuckles. Each stage (12), (14), (16), (18) and the knuckle arm (20), and palm arm (22) serves as an installation site for the various controller interface devices such as: dials, wheels, joysticks, touch screen; camera, scanner, phone, speaker, microphone, switches, signal-strength bar, power bar, sensitivity control, security screener, and sensors that respond to motion and/or pressure, and that interface with one or multiple program applications and devices; and can also serve as installation sites for the power source or other components. The aforementioned controller interface devices are shown on each of stages (12), (14), (16) and (18) in FIG. 1C, Controller interface devices (100) shown on stages (12), (14), (1.6) and (18) of FIG. 1C, may be any of the aforementioned controller interface devices and are present on each of the plurality of stages (12), (14), (16) and (18) according to the illustrated embodiment. The support elements (24), (26), and (28) provide the essential stability required to operate the input devices while integrated with the hand. The actual size and configuration of the support elements (26) and (28) may change contingent upon the specific devices installed and their need for stability in the various planes of motion.

Advantages

From the description above, a number of advantages of my hand integrated mouse platform become evident:
a) Provides a new and distinctly different controller platform option for users and manufacturers.
b) Provides a means for accommodating a multitude of controls such as: dials, wheels, joysticks, touch screen, camera, scanner, phone, speaker, microphone, switches, signal-strength bar, power bar, sensitivity control, security screener, and sensors that respond to motion and/or pressure; and that interface with one or multiple program applications and devices.
c) Provides a housing for the power source.
d) Provides the operator with the ability to utilize the mouse platform while doing other things that require the substantial use of their hands and fingers (such as keyboarding, driving, flying).
e) Provides minimal interference while relieving users from the need to pick up, put down, or reach for the mouse or other platforms between operations.
f) Can be either a wired or wireless (battery or rechargeable) platform as determined by its specific proposed use and the space requirements of each individual controller, with wireless being the most likely and efficient.
g) Other benefits include: saving time, reducing operating space requirements, and reducing the likelihood of developing repetitive strain injury in the shoulder, elbow, and carpal tunnel.
h) Allows the user more flexibility in body positioning
i) Can be used to remotely operate other computer controlled devices.
j) Lends itself to evolutionary changes as the electronic world becomes increasingly miniaturized and more fictional.

Conclusions, Ramifications, and Scope

Accordingly, the reader will see that the Hand Integrated Mouse Platform can be used for a wide variety of computer interface applications and is limited only by the present state of the art.

Provides a new and distinctly different controller platform option for users and manufacturers.
Provides a means for accommodating a multitude of controls in or on the Hand Integrated Mouse Platform such as: dials, wheels, joysticks, touch screen, camera, scanner, phone, speaker, microphone, switches, signal-strength bar, power bar, sensitivity control, security screener, and sensors that respond to motion and/or pressure; and that interface with one or multiple program applications and devices.
Provides a housing for the power source.
Provides the operator with the ability utilize the mouse platform while doing other things that require the substantial use of their hands and fingers (such as keyboarding, driving, flying).
Provides minimal interference while relieving users from the need to pick up, put down, or reach for the mouse or other platforms between operations.
Can be either a wired or wireless (battery or rechargeable) platform as determined by its specific proposed use and the space requirements of each individual controller, with wireless being the most likely and efficient.
Other benefits include: saving time, reducing operating space requirements, and reducing the likelihood of developing repetitive strain injury in the shoulder, elbow, and carpal tunnel.
Allows the user more flexibility in body positioning
Can be used to remotely operate other computer controlled devices.
Lends itself to evolutionary changes as the electronics world becomes increasingly miniaturized and more functional.

In one embodiment, provided is a hand integrated mouse platform for incorporating single or multiple computer input devices, comprising a single unitary housing including at least one opening therethrough for receiving a corresponding proximal phalanx of an individual finger other than a thumb, of a user, and at least one operable input device disposed therein or thereon. The single unitary housing is illustrated most clearly in FIGS. 1A, 1B, 2A, 2B, 3A and 3B. The user's thumb is disposed outside the housing when the hand integrated mouse platform is disposed on the user's hand. The openings each receive a corresponding proximal phalanx of an individual finger other than a thumb, of a user. FIG. 1A illustrates the inner surfaces of the openings that receive a corresponding individual finger other than a thumb, of a user and these inner surfaces are proximal phalanx facing surfaces. The figures, such as FIG. 1, FIG. 1.1, FIG. 2, FIG. 3 and FIG. 3.1 each illustrate the feature that no portion the hand integrated mouse platform is worn on the user's thumb and each of the illustrated embodiments illustrates the feature that the hand integrated mouse platform is sized to be worn between the metacarpals and the interphalangeal articulation of the user's hand closest to the user's palm, i.e. each opening receives only the proximal phalanx of an individual finger. The illustrated embodiments also illustrates the feature that the depth of the openings that receive the proximal phalanges is less than the length of the proximal or intermediate phalanges of the user.

The hand integrated mouse platform can be worn on either the proximal phalanges or the intermediate phalanges and it can easily move back and forth between the two positions to accommodate the user performing other tasks with his fingers while wearing the hand integrated mouse platform. When the hand integrated mouse platform is worn on the proximal phalanges and between the metacarpals and the knuckle closest to the palm, the intermediate phalanges and distal phalanges of the fingers are disposed outside the housing and are therefore free to move. The resulting freedom enables dexterity that allows the user to do other things such as operate a keyboard, drive a vehicle, write with a pen or pencil, or operate various other devices, some examples of which are shown in the figures. The illustrations show that the openings that extend through the housing have a depth, i.e. the housing thickness at the openings, less than the length of the user's proximal phalanx such that the housing is sized to be wearable on the proximal phalanx. However, the hand integrated mouse platform can be worn on other body parts such as the intermediate phalanges in other embodiments in which the distal phalanges of the fingers are disposed outside the housing and are therefore free to move. Stated alternatively, the housing is sized to be worn between the metacarpophalangeal joints and the interphalangeal articulations of said user's hand closest to the user's palm in one embodiment, but can be worn on the intermediate phalanges in other embodiments.

Although the description above contains many specifications, there should not be construed as limiting the scope of the embodiment but as merely providing illustrations of some of the presently preferred embodiments. The Hand Integrated Mouse Platform is indeed a unique and highly useful utility with numerous potential controller applications within the computer and electronic device universe. The ramifications of my invention are that it could revolutionize the entire world of computer and electronic control platforms.

Specifications

I contemplate that the material of this hand integrated mouse platform will be made of plastic, but other materials and combinations of materials are also suitable. The depicted and described embodiment is for a right handed male with a small hand. Other embodiments would accommodate different hand sizes (adult and children) and orientations (left and right). Various platform configurations to accommodate one or a multitude of primarily thumb-operated input devices such as: dials, wheels, joysticks, touch screen, camera, scanner, phone, speaker, microphone, switches, signal-strength bar, power bar, sensitivity control, security screener, and sensors that respond to motion and/or pressure, and that interface with one or multiple program applications and devices are intended. The preferred finished embodiment will operate remotely and be tailored to the individual. The beauty of this utility is that it can be easily adapted to meet a wide variety of requirements and can also be easily customized to accommodate individual preferences and/or physical limitations. It lends itself to evolutionary changes as the electronics world becomes increasingly miniaturized and more functional.

I claim

1. A hand integrated mouse platform for incorporating single or multiple computer input devices, comprising:
a single unitary housing wearable on at least one of a user's fingers and including at least one opening therethrough, each said opening at least partially surrounding a proximal or intermediate phalanx of a corresponding individual finger other than a thumb, of said user when said hand integrated mouse platform is worn on said user's hand, and a plurality of operable input devices disposed therein or thereon, said user's thumb outside said housing and said single unitary housing including a contoured outwardly facing end face facing said user's thumb when said hand integrated mouse platform is worn on said user's hand, said contoured outwardly facing end face including a plurality of contours, and a plurality of stages defined by said contours, each said stage including one said operable input device disposed therein or thereon and operable by said user's thumb when said hand integrated mouse platform is worn on said user's hand,
wherein no portion said hand integrated mouse platform is worn on said user's thumb and inner surfaces of said openings comprise proximal or intermediate phalanx facing surfaces when said hand integrated mouse platform is worn on said user's hand.

2. The hand integrated mouse platform of claim 1 wherein said platform is constructed of easily formed and molded material(s) such as plastic or composites and said housing is wearable on said at least one proximal phalanx of said user wherein said user's intermediate and distal phalanges are disposed outside said housing and said housing is further wearable on said at least one intermediate phalanx of said user, wherein said user's distal phalanges are disposed outside said housing.

3. The hand integrated mouse platform of claim 1 wherein said operable input device comprises at least one of: a dial, a wheel, a joystick, touch screen, camera, scanner, phone, speaker, microphone, switches, signal-strength bar, power bar, sensitivity control, security screener, and sensors that respond to motion and/or pressure, said operable input device interfacing with one or multiple program applications and devices.

4. The hand integrated mouse platform of claim 1 wherein said platform can incorporate its own power source.

5. The hand integrated mouse platform of claim 1 wherein said platform allows users to operate a multitude of computer interfaces while simultaneously keeping their hands and fingers free for other functions.

6. The hand integrated mouse platform of claim 1, wherein said single or multiple computer input devices are wireless devices.

7. The hand integrated mouse platform of claim 1, wherein said at least one opening therethrough comprises a first opening circumferentially surrounded by said housing and a second opening that said housing only partially encircles.

8. The hand integrated mouse platform of claim 7, wherein said hand integrated mouse platform extends laterally past said second opening and includes a recess for receiving said user's third finger thereon, a ridge separating said second opening from said recess, and wherein said hand integrated mouse platform includes an opposed end face facing said user's fourth finger and including a contoured surface for accommodating said user's fourth finger thereagainst.

9. The hand integrated mouse platform of claim 1, wherein said single unitary housing includes an outwardly facing front face when worn on said user's hand, said front face including contoured, non-planar surfaces.

10. A hand integrated mouse platform for incorporating single or multiple computer input devices, comprising:
a single unitary housing wearable on at least one of a user's fingers and at least one opening therethrough for holding only a proximal phalanx or only an intermediate phalanx of a corresponding individual finger other than a thumb, of said user when said hand integrated mouse platform is worn on said user's hand, and a plurality of operable input devices disposed therein or thereon, said user's thumb disposed outside said housing and said single unitary housing including a contoured outwardly facing end face facing said user's thumb when said hand integrated mouse platform is worn on said user's hand, said contoured outwardly facing end face including a plurality of contours, and a plurality of stages defined by said contours, each said stage including one said operable input device disposed therein or thereon, and operable by said user's thumb when said hand integrated mouse platform is worn on said at least one individual finger of said user's hand, wherein no portion said hand integrated mouse platform is worn on said user's thumb and said single unitary housing includes a plurality of said openings, each for receiving one said corresponding individual finger other than a thumb, of said user and including inner surfaces that comprise proximal or intermediate phalanx facing surfaces when said hand integrated mouse platform is worn on said user's hand.

11. The hand integrated mouse platform of claim 10, wherein said operable input device comprises at least one of a dial, a wheel, a joystick, touch screen, camera, scanner, phone, speaker, microphone, switches, signal-strength bar, power bar, sensitivity control, security screener, and a sensor that responds to motion and/or pressure, each said operable input device interfacing with one or multiple program applications and devices.

12. A hand integrated mouse platform for incorporating single or multiple computer input devices, consisting of:
a single unitary housing including at least one opening therethrough for holding only a proximal phalanx or only an intermediate phalanx of a corresponding individual finger other than a thumb, of a user when said hand integrated mouse platform is worn on said user's hand, and a plurality of operable input devices disposed therein or thereon, said user's thumb disposed outside said housing and said single unitary housing including a contoured outwardly facing end face facing said user's thumb when said hand integrated mouse platform is disposed on said user's hand, said contoured outwardly facing end face including a plurality of contours, and a plurality of stages defined by said contours, each said stage including one said operable input device disposed therein or thereon and operable by said user's thumb when said hand integrated mouse platform is disposed on said user's hand, said end face oriented generally orthogonal to a longitudinal direction of said single unitary housing and each said opening surrounded by a proximal or intermediate phalanx facing surface when said hand integrated mouse platform is worn on said user's hand.

13. The hand integrated mouse platform of claim 12, wherein said operable input device comprises at least one of a dial, a wheel, a joystick, touch screen, camera, scanner, phone, speaker, microphone, switches, signal-strength bar, power bar, sensitivity control, security screener, and a sensor that responds to motion and/or pressure, said operable input device interfacing with one or multiple program applications and devices.

14. The hand integrated mouse platform of claim 12, wherein said single or multiple computer input devices are wireless devices.

15. The hand integrated mouse platform of claim 12, wherein said at least one opening therethrough comprises a first opening circumferentially surrounded by said housing and a second opening that said housing only partially encircles, said first opening adapted to receive an index finger of said user's hand and said second opening adapted to receive an adjacent middle finger of said user's hand.

16. The hand integrated mouse platform of claim 12, wherein said single unitary housing includes an outwardly facing front face when worn on said user's hand, said front face including contoured, non-planar surfaces.

17. A hand integrated mouse platform for incorporating single or multiple computer input devices, comprising:
a single unitary housing wearable on at least one of a user's fingers and including at least one opening therethrough that at least partially surrounds a proximal phalanx of one corresponding individual finger other than a thumb, of said user when said hand integrated mouse platform is worn on said user's hand, an end face having contoured, non-planar surfaces defining a plurality of stages, and at least one operable input device disposed on each of said plurality of stages and operable by said user's thumb when said hand integrated mouse platform is worn on said user's proximal phalanges, said user's thumb disposed outside said housing and said user's intermediate and distal phalanges disposed outside said housing when said hand integrated mouse platform is worn on said user's hand, wherein no portion said hand integrated mouse platform is worn on said user's thumb and said end face is disposed generally orthogonal to a longitudinal direction of said single unitary housing.

18. The hand integrated mouse platform of claim 17, wherein said at least one opening includes a first opening adapted to circumferentially surround said proximal phalanx of an index finger of said user's hand and a second opening adapted to receive and only partially encircle an adjacent middle finger of said user's hand, each of said first and second openings including proximal phalanx facing inner surfaces.

19. The hand integrated mouse platform of claim 18, wherein said housing includes a concave portion to receive thereon a ring finger of said user's hand and said second opening is at least partially defined by a ridge disposed between said adjacent middle finger and said ring finger of said user's hand.

20. A hand integrated mouse platform for incorporating single or multiple computer input devices, comprising:
a single unitary housing including at least one opening therethrough at least partially surrounding a proximal phalanx or an intermediate phalanx of one corresponding individual finger other than a thumb, of a user when said hand integrated mouse platform is worn on said user's hand, said user's thumb disposed outside said housing when said hand integrated mouse platform is disposed on said user's hand, wherein no portion said hand integrated mouse platform is worn on said user's thumb or on distal phalanges of said user's fingers, wherein said single unitary housing includes an outwardly facing end face facing said user's thumb when said hand integrated mouse platform is worn on said user's hand, said outwardly facing end face disposed generally orthogonal to a longitudinal direction of said single unitary housing and including a plurality of contours and a plurality of stages defined by said contours, each said stage including an operable input device disposed therein or thereon.

21. The hand integrated mouse platform of claim 20, wherein said at least one opening includes a first opening circumferentially surrounded by said housing and a second opening that said housing only partially encircles, each said opening for accommodating one said corresponding individual finger of said user, and further comprising a third opening that said housing only partially encircles and is disposed between said first and second openings and wherein said hand integrated mouse platform includes an end face facing said user's fourth finger and including a contoured surface for accommodating said user's fourth finger there against.

* * * * *